March 1, 1960 R. G. KNAPP 2,927,310
TRAILER WARNING SIGNALS
Filed July 11, 1958
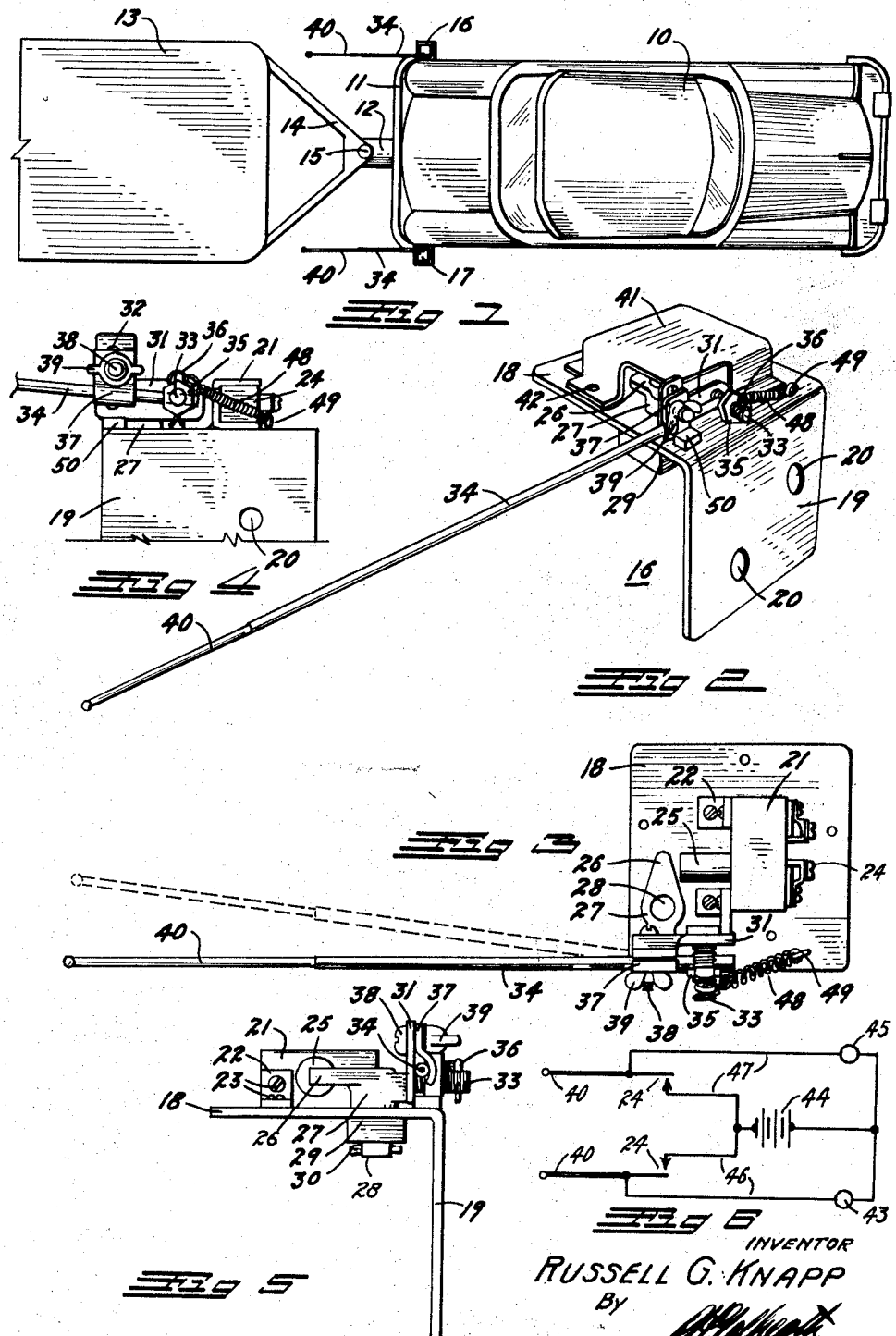
RUSSELL G. KNAPP
BY
ATTORNEY United States Patent Office 2,927,310
Patented Mar. 1, 1960

2,927,310

TRAILER WARNING SIGNALS

Russell G. Knapp, Denver, Colo.

Application July 11, 1958, Serial No. 748,070

2 Claims. (Cl. 340—282)

This invention relates to a signal device for trailer vehicles. It is often difficult for the driver of a tow car to be certain whether his vehicle is in alignment with, or at an angle to, a trailer. This makes it exceedingly difficult to back the trailer into a desired space without danger of upsetting the trailer or tow car or damaging the hitch. The principal object of this invention is to provide a device which will signal the driver when the angle between the tow car and trailer exceeds a predetermined degree and which will also indicate the direction of angular deviation between the two vehicles so that the driver can back the trailer any desired distance by heeding the directional signals.

Damage also results when pulling a trailer forwardly if a turn of too short radius is made. Another object of the present invention is to provide a signal device which will give a warning signal when a turn of dangerously short radius is made.

A further object is to provide a signal device which can be quickly and easily installed on present vehicles and which can be readily adjusted to conform to tow cars, trailers and hitches of various types.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the following detailed description of the invention, reference is had to the accompanying drawing which forms a part hereof. Like numerals refer to like parts in all views of the drawing and throughout the description.

In the drawing:

Fig. 1 is a plan view of a conventional automobile or "tow-car" with a trailing vehicle or "trailer" attached thereto with this invention in place thereon;

Fig. 2 is an enlarged perspective view of a signal switch unit as employed in the improved signal device;

Fig. 3 is a top view of the switch unit of Fig. 1 with its cover or housing removed;

Fig. 4 is a side view, partially broken away, of the uncovered switch unit;

Fig. 5 is a front view thereof; and

Fig. 6 is a diagram of electrical signal circuits in which the switch units are employed.

In Fig. 1 of the drawing, the tow car is shown at 10 with its rear bumper at 11 and its trailer hitch at 12. The trailer is shown at 13 provided with a conventional "A-frame" 14 projecting forwardly to a towing connection 15 on the tow car hitch 12.

The improved signal device employs two of the illustrated switch units, one being designated as a left hand unit 16 and the other as a right hand unit 17. The two units are structurally similar but of opposite hand. The unit shown in Figs. 2 through 5 is the left hand unit 16. The right hand unit 17 would be similar except that the positions of the elements therein would be reversed.

Each switch unit comprises an angle bracket plate having a horizontal portion 18, upon which the switch mechanism is mounted, and a vertical portion 19. The vertical portion 19 is provided with suitable bolt holes 20 through which attachment bolts or screws may be passed for securing the angle bracket plates to the opposite sides of and adjacent the rear of, the tow car in any suitable manner. Usually, the bracket plates are secured to the forwardly extending side extremities of the rear bumper 11 of the tow car 10. The manner of attachment will vary, however, with different types of tow cars, bodies and chassis.

A sidewardly-opening, channel-shaped switch housing 21 is secured upon the horizontal portion 18 of each bracket plate by means of attachment clips 22 and attachment screws 23. A conventional, normally open, push-button type switch 24 is mounted in the housing 21 with its push button, indicated at 25, projecting rearwardly through the housing. The switches 24 may be of any of the limited movement snap-action types such as a "Micro" switch.

The push button 25 is positioned to be depressed by a rocker arm 26 projecting from a hub 27 fixedly mounted on the upper extremity of a rocker shaft 28. The rocker shaft 28 extends downwardly through a bearing opening in the horizontal portion 18 of the bracket plate and through a bearing block 29 welded or formed on the horizontal portion 18. The shaft 28 projects downwardly from, and is secured in, the bearing block by means of a suitable cotter key 30.

An L-shaped lever member 31 is formed on or permanently attached to the hub 27. The arm plate has a horizontal portion extending forwardly substantially at right angles to the longitudinal axis of the rocker arm 26 and a vertical portion extending upwardly from the rear extremity of the horizontal portion above the hub 27 and provided with a vertically-elongated bolt slot 32.

A rotatable pivot bolt 33 extends through the horizontal portion of the lever member 31 adjacent its forward extremity. An elongated feeler tube 34 is mounted on the pivot bolt 33 and extends rearwardly therefrom. The feeler tube 34 may be mounted on the pivot bolt 33 in any desired manner. The tube 34 is preferably passed through the bolt 33 so that the length of its projection from the bolt can be adjusted by sliding it through the bolt. It can be locked in the adjusted position by means of a suitable clamp nut 35 threaded on the bolt. Loss of the clamp nut 35 is prevented by means of a second cotter key 36.

The feeler tube 34 is clamped at a radial position relative to the bolt 33 by means of a clamping clip 37. The clip 37 is drawn into clamping relation with the feeler tube 34 by means of a clamp bolt 38 passing through the vertically-elongated slot 32 in the lever member 31 and is provided with a suitable wing nut 39. A feeler rod 40 is telescopically and frictionally fitted into the rear extremity of the feeler tube 34 and projects rearwardly therefrom.

The mechanism is protected by means of a suitably formed cover 41 which is mounted on the horizontal portion 18 by means of attachment screws 42. A tension spring 48 is secured to the second cotter key 36 and extends forwardly to an attachment 49 on the horizontal portion 18 of the mounting plate. The tension spring 48 constantly urges the rocker arm 26 rearwardly and away from the push button 25. A stop boss 50 on the portion 18 is contacted by the lever 31 to limit the rearward movement of the rocker arm and the outward movements of the feeler elements.

When the switch units 16 and 17 are in place on the tow car 10, the feeler tubes 34 and their feeler rods 40 project rearwardly at each side of the trailer A-frame 14 so as to be contacted by the latter when axes of the tow car and the trailer depart from alignment with each other.

The heights and shapes of A-frames vary. The feeler rods 40, however, can be adjusted for height by loosening the wing nuts 39 and raising or lowering the clamp bolts 38 in the slots 32 after which they are again clamped in place by means of the wing nuts 39. Thus, the feeler rods can be quickly adjusted to the vertical plane of any A-frame 14. The horizontal projection of the feeler members can also be easily adjusted to suit various types of A-frames and hitches by simply sliding the rods 40 into or out of the tubes 34. They will be retained in the adjusted position by frictional engagement. For exceedingly short adjustments, the projection of the feeler tubes can be adjusted in the pivot bolts 33. Thus, the switch units can be adjusted to any desired degree of sensitivity.

The switch units can be connected in any desired signal circuits in the tow car. Such a circuit is illustrated in Fig. 6 wherein the switch 24 of the left switch unit is connected in a series circuit 43 with a "left" signal light 44 and a battery 45. The switch 24 of the right switch unit is similarly connected in a series circuit 46 with a "right" signal light 47. The signal lights 44 and 47 indicate to the driver that the trailer is angling to the left or right, respectively, so that proper corrections can be made.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A signal device for signalling the departure of the axis of a trailer vehicle from alignment with the axis of a towing vehicle comprising: two angle mounting brackets each having a horizontal and a vertical portion; a vertically positioned rocker shaft rotatably mounted in each horizontal portion; a hub secured on each shaft above said horizontal portion; a rocker arm projecting from said hub; a push-button type switch mounted on each horizontal portion positioned to be actuated by the rocker arm thereon; a feeler element secured to and projecting rearwardly from each hub member for rotating the rocker arm thereon; means securing the vertical portions of said angle mounting bracket to each side of and adjacent the rear of the towing vehicle so that said feeler elements extend on each side of the forward portion of the trailer vehicle; resilient means urging said feeler elements inwardly toward each other; stop means limiting the inward movements of said feeler elements; and electric signal circuits including said switches.

2. A signal device as described in claim 1 having an L-shaped lever having a horizontal and a vertical portion secured to each hub member, means pivotally mounting the feeler element on the horizontal leg of said lever; and means for clamping said feeler element at any desired height on the vertical portion thereof.

References Cited in the file of this patent

UNITED STATES PATENTS

| | | |
|---|---|---|
| 2,214,161 | Cater | Sept. 10, 1940 |
| 2,508,149 | Eliassen | May 16, 1950 |
| 2,754,499 | Jost | July 10, 1956 |